United States Patent
Büttner

(10) Patent No.: US 10,035,371 B2
(45) Date of Patent: Jul. 31, 2018

(54) DEVICE FOR CONNECTING TWO OBJECTS

(71) Applicant: X17 GMBH, Saarbrücken (DE)

(72) Inventor: Matthias Büttner, Saarbrücken (DE)

(73) Assignee: X17 GMBH, Saarbrücken (DE)

( * ) Notice: Subject to any disclaimer, the term of this patent is extended or adjusted under 35 U.S.C. 154(b) by 164 days.

(21) Appl. No.: 14/584,418

(22) Filed: Dec. 29, 2014

(65) Prior Publication Data
US 2017/0043610 A1 Feb. 16, 2017

(30) Foreign Application Priority Data

Dec. 30, 2013 (DE) .................. 10 2013 114 982

(51) Int. Cl.
| F16B 2/22 | (2006.01) |
| F16B 2/18 | (2006.01) |
| B43K 23/00 | (2006.01) |
| B42D 3/12 | (2006.01) |
| B42D 3/18 | (2006.01) |

(52) U.S. Cl.
CPC .............. *B43K 23/001* (2013.01); *B42D 3/12* (2013.01); *B42D 3/18* (2013.01); *F16B 2/185* (2013.01); *F16B 2/22* (2013.01); *B42P 2241/18* (2013.01)

(58) Field of Classification Search
CPC .......... B43K 23/001; F16B 2/22; F16B 2/185; B42D 3/12; B42D 3/18; B42P 2241/18; Y10T 24/203; Y10T 24/204; Y10T 24/44923; B42F 1/006
See application file for complete search history.

(56) References Cited

U.S. PATENT DOCUMENTS

| 1,133,388 | A | * | 3/1915 | Merrill | ...................... G09F 3/20 24/530 |
| 1,346,393 | A | * | 7/1920 | Woodhouse | ......... B43K 23/001 281/30 |
| 5,058,242 | A | * | 10/1991 | Liu | ......................... B42F 9/001 24/67 R |
| 5,666,702 | A | * | 9/1997 | Ming-Chieh | ........... B42F 1/006 24/338 |
| 6,327,749 | B1 | * | 12/2001 | Antinone | ................ B42F 1/006 24/67 R |
| 6,363,941 | B1 | * | 4/2002 | Combs | .................... A24F 13/22 131/187 |
| 6,453,518 | B1 | * | 9/2002 | Adams | .................. B42F 15/066 24/67.9 |
| 6,477,744 | B1 | * | 11/2002 | Miles | ................... B43K 23/002 24/3.1 |
| 7,120,970 | B2 | * | 10/2006 | Thomson | .................. A45C 1/06 24/67 R |

(Continued)

*Primary Examiner* — Robert John Sandy
*Assistant Examiner* — Rowland Do
(74) *Attorney, Agent, or Firm* — Lucas & Mercanti, LLP; Klaus P. Stoffel

(57) ABSTRACT

A device for connecting two objects, especially for holding a writing instrument on a notebook or the like, with a clamping body having clamping arms extending across a narrow side, for example, of the notebook, which clamping body grips one of the objects in a pliers-like fashion with its clamping arms and forms a holder for holding the other object, e.g., the writing instrument, parallel to the longitudinal direction of the narrow side. Mechanisms are provided to spread open the clamping arms.

15 Claims, 2 Drawing Sheets

(56) References Cited

U.S. PATENT DOCUMENTS

| | | | | |
|---|---|---|---|---|
| 7,597,296 B2 * | 10/2009 | Conway | ............... | A47B 47/05 |
| | | | | 248/229.16 |
| 7,770,263 B2 * | 8/2010 | Thomson | ............... | A45C 1/06 |
| | | | | 24/558 |
| 2015/0342313 A1 * | 12/2015 | Antinone | ............... | B42F 1/08 |
| | | | | 342/357.51 |

* cited by examiner

DEVICE FOR CONNECTING TWO OBJECTS

CROSS-REFERENCE TO RELATED APPLICATIONS

The present application claims priority of DE 10 2013 114 982.0, filed Dec. 30, 2014, the priority of this application is hereby claimed and this application is incorporated herein by reference.

BACKGROUND OF THE INVENTION

The invention pertains to a device for connecting two objects, especially for holding a writing instrument on a notebook or the like, with a clamping body, which grips one of the objects in pliers-like fashion with its clamping arms and which forms a holder to hold the other object.

Devices for holding a writing instrument on a notebook in which the clamping body is formed exclusively by a U-shaped sheet-metal clip, which can be seated on the notebook, are known from prior use. A channel remaining between the back of the sheet-metal clip and the associated narrow side of the notebook forms the holder which holds the writing instrument. The writing instrument is held in position in the longitudinal direction on the sheet-metal clip, i.e., on the notebook, by the clamping action of a spring clip attached to the writing instrument, which clamps the writing instrument to the back of the sheet-metal clip.

SUMMARY OF THE INVENTION

The present invention is based on the goal of creating a novel holding device of the type described above which offers greater retention security and is easier to use than the holding device of this type known from the prior art.

The holding device according to the invention which achieves this goal is characterized by mechanisms for spreading open the clamping arms.

It is advantageous that, when the clamping arms are in the spread-out state, the clamping body of the device according to the invention can be conveniently arranged in the clamping position on the one object, wherein, after the arms have been released from their spread-apart state against an elastic restoring force, strong clamping forces, which ensure a high degree of retention security, can go in the effect.

In the simplest case, the previously mentioned spreading mechanisms are formed by configuring the clamping arms so that they proceed away from each other as they approach their free ends. The slanted planes thus formed on the inside surfaces of the clamping arms cause the clamping arms to spread apart as they are being seated on, for example, a notebook. The clamping body preferably grips a narrow side of the notebook, and the holder for holding the writing instrument is provided parallel to the longitudinal direction of the narrow side.

In a preferred embodiment of the invention, the clamping arms can be spread apart by the spreading mechanisms to a degree which exceeds the clamping gap required for them to clamp an object; in particular they can be spread apart to a degree beyond the thickness of a notebook. In particular, a spreading distance exceeding the thickness of the notebook facilitates the placement of the holding device in the clamping position.

In an especially preferred embodiment of the invention, the spreading mechanisms comprise lever arms which can be squeezed together to spread open the clamping arms.

Especially in one embodiment, in which the clamping body comprises a U-shaped clamp with U-arms as clamping parts and a base arm which connects the U-arms to each other, the lever arms can cooperate with the said clamping arms to form two armed levers, while each end of the base arm forms a fulcrum for one of the two-armed levers.

In a further embodiment, each lever arm is connected to a free end of a clamping arm, wherein the lever arms are preferably hinged to the clamping arms pivotably toward the clamping arms. After the process of clamping the holding device to a notebook, for example, is completed, it is advantageous, as a way of saving space, for the lever arms to be pivoted into a position in which they no longer project from the narrow side of the notebook but rather rest against the cover of the notebook.

The lever arms are preferably latchable in at least one pivot position in which they are resting against an object. In the latter embodiment, the U-shaped clamp consists preferably of sheet metal and the lever arms are formed by wire stirrups.

Eyelet parts can be produced on the clamping arms by bending them; the bent-over ends of the lever arms consisting of wire stirrups can then engage in these eyelets.

The clamping body preferably extends in, for example, the longitudinal direction of the narrow side of a notebook over a distance equal to at least half the length of the clamping arms. Providing the clamping body with sufficient length in the direction of the longitudinal axis of, for example, a writing instrument, makes it possible to ensure that the holder provides a stable writing instrument holding function.

The holder is preferably formed on the side of the base arm of the clamp facing away from the clamping arms. The holder is advisably a sleeve, which at least partially surrounds the other object.

The holder can be cushioned against the other object, so that a writing instrument cannot be damaged by scratching, for example. The clamping arms can also comprises a nonslip cushioning where they rest against the object.

The other object is advisably clampable in the sleeve, for which purpose the sleeve comprises a longitudinal slot-like opening. In another embodiment, the sleeve can be formed by connecting the outside surfaces of the clamping arms to the ends of a loop curving over the base arm, wherein the receiving sleeve is formed between the loop and the base arm. The loop preferably consists of a flexible, possibly elastic, material such as a leather or rubber band.

In another embodiment, the entire holding device can be produced as a single unit in the form of an injection-molded plastic part. Sheet metal can also be bent to form a one-piece configuration.

The above-mentioned embodiment with a loop can comprise the additional feature that the sleeve formed by the loop and the base arm can be spread apart by squeezing the lever arms together, thus releasing the writing instrument from its arrest in the sleeve.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
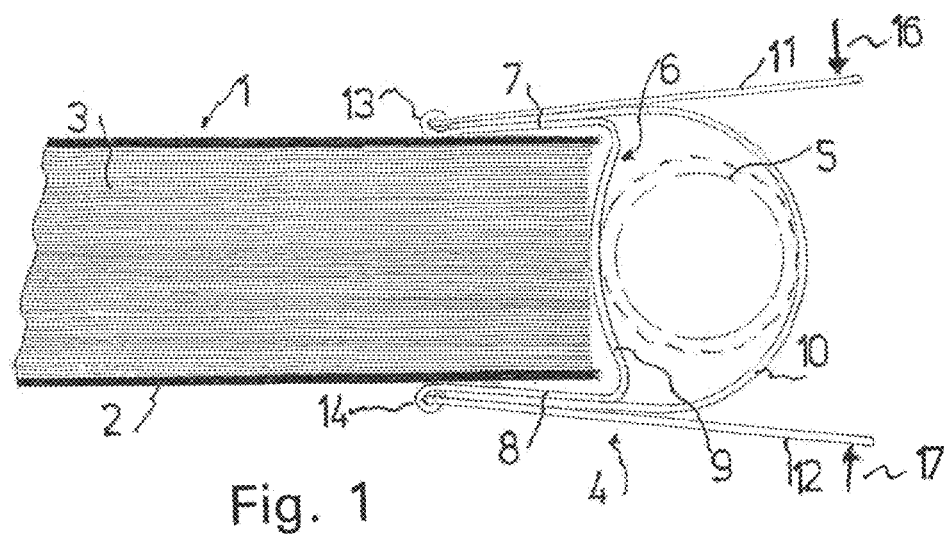
FIG. 1 shows a plan view of an inventive holding device according to the invention attached to a notebook.
Figure 2:
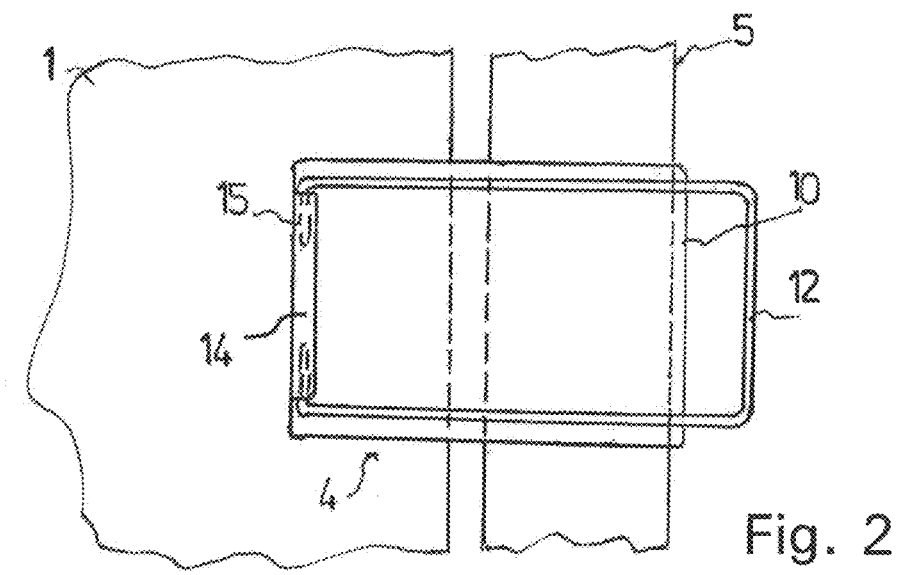
FIG. 2 shows a side view of the holding device of FIG. 1.

A device 4 for holding a writing instrument 5, e.g. a ball-point pen or the like, is clamped to a notebook 1, part of which is shown from above in FIGS. 1 and 2, with a cover 2 and writable pages 3, wherein the device extends across the narrow vertical side of the notebook 1 visible in FIG. 1.

The holding device 4 comprises a U-shaped clamp 6 with U-arms 7 and 8 forming the clamping parts and a base arm 9, which connects the U-arms 7, 8 to each other. The inside surfaces of the clamping parts or U-arms 7, 8 rest against the cover 2 of the notebook 1. In the example shown, the U-shaped clamp 6 is made of elastic sheet-metal material. As can be seen in FIG. 2, the dimension of the clamp 6 in the longitudinal direction of the associated narrow side of the notebook 1 is greater than the length of the U-arms 7, 8.

On their outside surfaces, the U-arms 7, 8 are connected to the ends of a flexible loop 10. The loop 10, which can be adhesively bonded to the U-arms 7, 8, for example, consists in the example shown of leather and cooperates with the base arm 9 to form a sleeve, serving as a holder to accommodate the writing instrument 5. In a departure from the example shown, the base arm 9 could comprise a cushioning layer to protect the writing instrument 5 from being scratched. An elastic band could also be used to form the loop 10.

A stirrup-shaped lever arm 11, 12 is attached to the free end of each of the U-arms 7, 8 of the clamp 6. The lever arms 11, 12 cooperate with the U-arms 7, 8 to form two-armed levers, the fulcrums of which lie on the ends of the base arm 9.

The sheet metal of the U-arms 7, 8 is bent into a tubular eyelet 13, 14 at each of the free ends. The bent ends 15 of the lever arms 11, 12, which are formed out of wire in the example in question, engage in these eyelets 13, 14. Each of the tubular eyelets 13, 14 can be configured in two parts, and the bent ends 15 of the stirrup-shaped arm 11, 12 can be inserted between the two parts of the eyelet.

When the holding device 4 described above is to be used, the lever arms 11, 12 are squeezed together as indicated by the arrows 16, 17, wherein the U arms 7, 8 are spread apart. At a spreading width which is greater than the thickness of the notebook 1, the holding device 4 can be easily set onto the notebook 1 in the direction perpendicular to the gripped narrow side. Releasing the lever arms 11, 12 allows the holding device 4 to clamp itself onto the notebook 1. The writing instrument 5 can now be pushed into the sleeve formed by the loop 10 and the base arm 9. The process of attaching the holding device 4 to the notebook 1 just described can also be performed with the writing instrument 5 already inserted.

The holding device 4 can also be removed from the notebook 1 while the writing instrument 5 is still inserted, or it can be done after the writing instrument has been removed. By squeezing the lever arms 11, 12 together as indicated by the arrows 16, 17, the U-arms 7, 8 are lifted from the cover 2 of the notebook 1, and the device 4 can be easily pulled away from the notebook 1.

Figure 3:
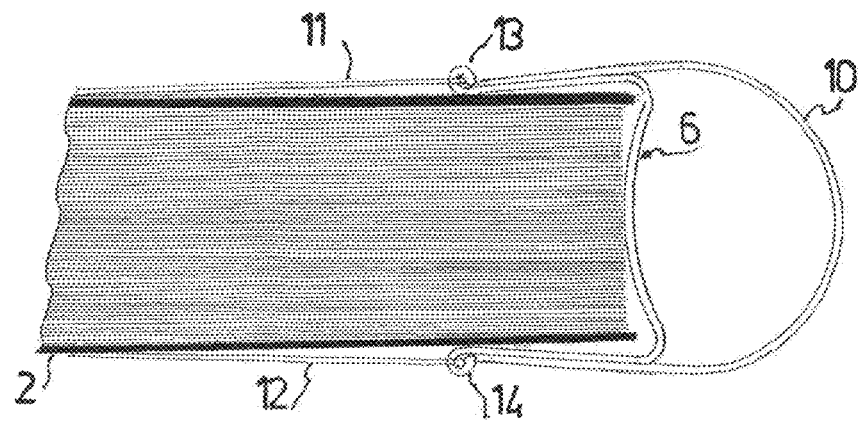
FIG. 3 shows the holding device of FIG. 1 with pivoted lever arms.

As FIG. 3 shows, the lever arms 11, 12 do not need to remain in the position shown in FIG. 1 while the holding device 4 is in the clamping position. According to FIG. 3, the lever arms 11, 12 can be pivoted, so that they are more-or-less parallel to the cover 2 of the notebook 1 and thus occupy very little space. In the pivoted position shown in FIG. 3, the lever arms 11, 12 latch in position, which is achieved in that the bent-over ends 15 project at a slight angle into the eyelets 13, 14, and the eyelets 13, 14 are slightly flattened to form an oval inside cross section. A latching function can therefore also be achieved in the position shown in FIG. 1.

In the following figures, the same or equivalent parts are designated by the same reference numbers as those used in the preceding FIGS. 1-3, wherein the letter a, b, or c is added to the reference number in question.

Figure 4:
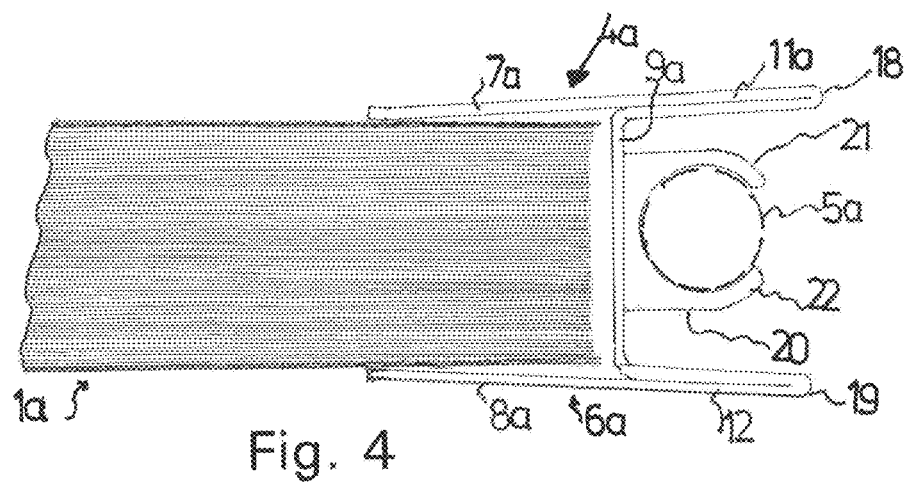
FIG. 4 shows a plan view of a second exemplary embodiment of a holding device according to the invention.
Figure 5:
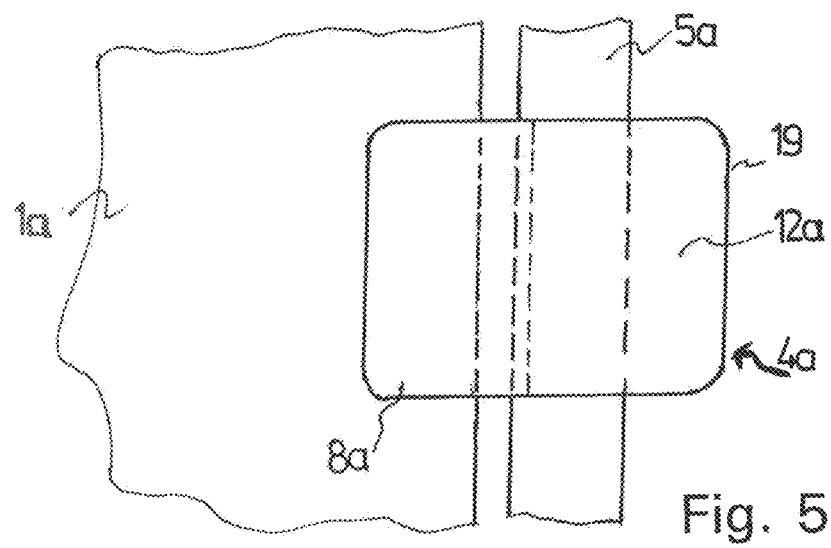
FIG. 5 shows a side view of the holding device of FIG. 4.

FIGS. 4 and 5 show an exemplary embodiment of a holding device 4a, which is produced as a one-piece unit from a strip of sheet metal by bending this metal strip and which comprises, like the preceding holding device 4, a U-shaped clamp 6a with U-arms 7a, 8a, and a base arm 9a. The U-arms 7a, 8a providing the clamping function cooperate with the lever arms 11a, 12a to form two-armed levers. As can be seen in FIG. 4, each of the lever arms 11a, 12a is formed by two sheet metal layers, the sheet metal having been bent over at the folds 18, 19 so that the two layers lie on top of each other. It is obvious that the double layer increases the stiffness of the lever arms 11a, 12a.

To form a holder for a writing instrument 5a, a holding element 20, preferably produced as an injection-molded plastic part, is attached to the base arm 9a; this holding element, which forms elastically spreadable clamping arms 21, 22, forms a partially open receiving sleeve for the writing instrument 5a. In the example shown here, the writing instrument 5a can be introduced into the holding element 20 both in the axial direction and, by spreading the clamping arms 21, 22 apart, in the radial direction.

The holding device 4a of FIGS. 4 and 5 can be easily attached to a notebook 1a and removed from it again regardless of whether the writing instrument 5a is seated in the holder or not.

Figure 6:
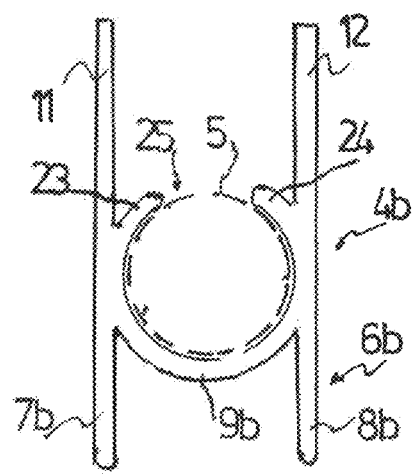
FIGS. 6 and 7 show additional exemplary embodiments of a holding device according to the invention.

An exemplary embodiment of a holding device 4b shown in FIG. 6 is produced as a one-piece injection-molded plastic part and comprises a U-shaped clamp 6b with U-arms 7b, 8b forming the clamping parts and a base arm 9b. The U-arms 7b, 8b merge with the lever arms 11a, 12b forming the lever parts, wherein the length of the lever parts or arms 11b, 12b in the example shown is approximately twice the length of the U-arms 7b, 8b.

The base arm 9b and the projections 23, 24 form a sleeve-like holder, comprising an opening 25, for a writing instrument 5b, into which the writing instrument can be inserted both in the axial direction and in the direction perpendicular to that.

Because of the opening 25, only the dimensions of the base arm 9b are essential to the clamping forces which are produced, i.e., to the lever forces to be exerted, in the exemplary embodiment of FIG. 6. The dimensions can be configured in such a way that high clamping forces are produced. By appropriately lengthening the lever arms 11b, 12b, a holding device of this type can nevertheless be easily operated.

Figure 7:
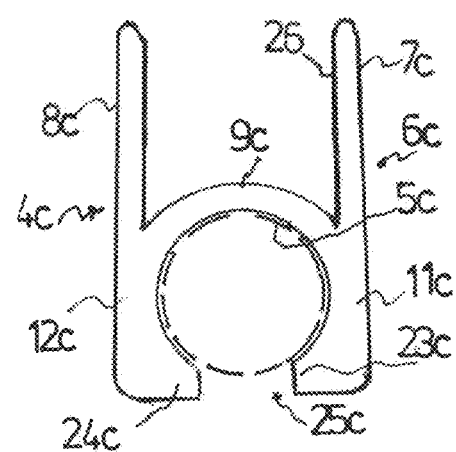

An exemplary embodiment of a holding device 4c shown in FIG. 7 is also based on a plastic injection-molded part. It comprises a U-shaped clamp 6c with U-arms 7c, 8c and a base arm 9c. As in the preceding exemplary embodiments, the U-arms 7c, 8c merge with the lever arms 11c, 12c. In the example of FIG. 7, the length of the lever parts formed by the lever arms 11c, 12c is less than the length of the U-arms 7c, 8c.

Jaw-like projections 23, 24 at the free ends of the lever arms 11c, 12c cooperate with the base arm 9c to form a sleeve-like holder for a writing instrument 5c. An opening 25c makes it possible to seat the writing instrument in the clamp.

The opening 25c also ensures that only the dimensions of the base arm 9c are essential to the clamping forces and to the lever forces to be exerted. In the example shown, because of the shortness of the lever arms 11c, 12c, the dimensions should be calculated in such a way that the U-arms 7c, 8c can be spread open without too much force. The thus-reduced clamping forces exerted by the U-arms 7c, 8c can be compensated by nonslip coverings 26 on the U-arms 7c, 8c.

It is obvious that the holding devices described above can also be used for purposes other than that described here; for example, they can serve to connect various other types of objects together as long as one of them can be gripped by the clamping arms, while the other can be placed in the holder.

The clamping body can be clamped in pliers-like fashion with its clamping arms to, for example, a mobile radio device, which can then be attached by the holding device to a carrier object. The holding device can also be used to attach a miniaturized video camera to an eyeglass frame, wherein the clamping arms can be adapted to grip one of the sidepieces of the eyeglass frame.

While specific embodiments of the invention have been shown and described in detail to illustrate the inventive principles, it will be understood that the invention may be embodied otherwise without departing from such principles.

I claim:

1. A device for holding a writing instrument (5) on a notebook (1), comprising: a U-shaped clamping body comprising U-arms that form clamping arms (7, 8), wherein the clamping arms grip the notebook (1) in pliers-like fashion; lever arms (11, 12) hinged to the clamping arms (7, 8) for spreading open the clamping arms (7, 8); and a flexible loop (10) that forms a holder for holding the writing instrument, wherein the flexible loop has ends fixed to outside surfaces of the clamping arms, and wherein the flexible loop (10) and a base arm of the U-shaped clamping body form a sleeve for receiving the writing instrument (5).

2. The device according to claim 1, wherein the clamping arms (7, 8) can be spread apart by the lever arms beyond the clamping distance required for the arms to clamp an object (1).

3. The device according to claim 1, wherein the lever arms can be squeezed together to spread open the clamping arms (7, 8).

4. The device according to claim 3, wherein each lever arm (11, 12) cooperates with a clamping arm (7, 8) to form a two-armed lever.

5. The device according to claim 4, wherein each end of the base arm (9) forms a fulcrum for one of the two two-armed levers.

6. The device according to claim 3, wherein each of the lever arms (11, 12) is connected to the free end of one of the clamping arms (7, 8).

7. The device according to claim 3, wherein the lever arms (11, 12) are hinged to the clamping arms (7, 8) pivotably toward the clamping arms (7, 8).

8. The device according to claim 7, wherein the hinged lever arms (11, 12) can be latched in at least one pivoted position.

9. The device according to claim 7, wherein the hinged lever arms (11, 12) can be latched in the position in which the hinged lever arms rest against an object (1).

10. The device according to claim 3, wherein the holder is formed on the side of the base arm (9) of the clamp (6) facing away from the clamping arms (7, 8).

11. The device according to claim 1, wherein the clamping arms are U-arms, and the clamping body comprises a U-shaped clamp (6) with the U-arms (7, 8) as clamping parts and a base arm (9) connecting the U-arms (7, 8) to each other.

12. The device according to claim 11, wherein the lever arms (11, 12) are formed by wire stirrups.

13. The device according to claim 1, wherein the holder is cushioned against the other object (5) and/or the clamping arms (7a, 8a) are cushioned against the other object (1).

14. The device according to claim 1, wherein the other object (5a, 5b) can be arrested in the holder.

15. The device according to claim 1, wherein the clamping body extends across the narrow side of the notebook (1), and the holder is provided to accommodate the writing instrument (5) parallel to the longitudinal direction of the narrow side.

* * * * *